(12) United States Patent
Nemeth et al.

(10) Patent No.: US 9,026,042 B1
(45) Date of Patent: May 5, 2015

(54) METHOD AND APPARATUS FOR SATELLITE COMMUNICATION WITH BASEBAND SWITCHING OVER AN IP NETWORK

(75) Inventors: David T. Nemeth, Washington, DC (US); Matthew A. Reklau, Herndon, VA (US); Sadaf Fardeen, Centreville, VA (US); Shan Sivagnanavelu, Bristow, VA (US)

(73) Assignee: VT IDirect, Inc., Herndon, VA (US)

( * ) Notice: Subject to any disclaimer, the term of this patent is extended or adjusted under 35 U.S.C. 154(b) by 58 days.

(21) Appl. No.: 13/619,084

(22) Filed: Sep. 14, 2012

Related U.S. Application Data (60) Provisional application No. 61/547,502, filed on Oct. 14, 2011.

(51) Int. Cl.
*H04B 7/212* (2006.01)
*H04B 7/204* (2006.01)

(52) U.S. Cl.
CPC ............................... *H04B 7/2048* (2013.01)

(58) Field of Classification Search
CPC .................................................. H04B 7/18515
USPC .......................................................... 455/12.1
See application file for complete search history.

(56) References Cited

U.S. PATENT DOCUMENTS

| | | | |
|---|---|---|---|
| 7,215,652 B1 | 5/2007 | Foley et al. | |
| 8,634,768 B2* | 1/2014 | Hudson et al. | ............... 455/12.1 |
| 2008/0043663 A1* | 2/2008 | Youssefzadeh et al. | ...... 370/321 |

OTHER PUBLICATIONS

Kantor et al., 'Diversity Investigation of Satellite Backbone Network for BFWA Systems', IWSSC 2009, pp. 1-5.*
Lin et al., 'Site Diversity for Satellite Earth Terminals and Measurements at 28 GHz', Proceedings of the IEEE, vol. 81, No. 6, Jun. 1993, pp. 897-904.*

* cited by examiner

*Primary Examiner* — Melvin Marcelo
(74) *Attorney, Agent, or Firm* — Oblon, McClelland, Maier & Neustadt, L.L.P.

(57) ABSTRACT

A rain diversity switchover system includes a diversity Satellite Access Station (SAS) including a transmitter modem and a receiver modem in communication with a satellite. The system further includes a primary SAS including a transmitter modem and a receiver modem in communication with the satellite via a second satellite antenna, where the transmitter and receiver modems of the primary SAS are synchronized with the transmitter and receiver modems of the diversity SAS via a common time source. Further, a hub data processor adjusts a timing of transmissions from the diversity SAS to the satellite relative to the common time source in accordance with a difference between a time of flight from the diversity SAS to the satellite and a time of flight from the primary SAS to the satellite. Additionally, a switchover controller controls a rain diversity switchover between the primary SAS and the diversity SAS.

30 Claims, 8 Drawing Sheets

METHOD AND APPARATUS FOR SATELLITE COMMUNICATION WITH BASEBAND SWITCHING OVER AN IP NETWORK

CROSS-REFERENCE TO RELATED APPLICATIONS

This application claims the benefit under 35 U.S.C. §119(e) of the earlier filing date of U.S. Provisional Application No. 61/547,502 entitled "Method and Apparatus for Satellite Communication with Baseband Switching Over an IP Network" filed Oct. 14, 2011, the entirety of which is incorporated herein by reference.

FIELD OF THE INVENTION

The present embodiments relate to the field of satellite communication and in particular, a method and apparatus for satellite communication under rain diversity using baseband switching over an IP network.

DISCUSSION OF THE BACKGROUND

The use of "bent pipe" satellites for two way communications is well known. While there are many interesting topologies, a common one is the TDMA star topology. In this arrangement, there is a central station (often referred to as the "hub") and multiple remote stations known as "remote terminals". The remote terminals can number anywhere from a few terminals to hundreds of thousands of terminals or more. In the star topology, the remote terminals communicate with the hub, and data flow occurs from hub to remote terminal and vice versa.

Networks with the star topology have a single continuous carrier from the hub which is received by all the remote terminals. (The same hub location often supports multiple such carriers, but typically a given remote terminal will only listen to one or two such carriers.) This carrier is sometimes referred to as the "outbound" carrier. Transmissions from the remote terminals to the hub are "inbound".

As the need for bandwidth increases, satellites have been designed to operate at higher and higher frequencies. As the frequency increases, the susceptibility to signal fading due to rain increases drastically. A link operating at 6 GHz may only need to accommodate a few dB of fade; this can easily be dealt with by overdesigning the satellite dish at the hub. However, as frequencies increase to 30 GHz, fades of tens of dB can occur. At these fade levels it is no longer practical to compensate by overdesigning the hub side RF equipment, and a strategy known as rain diversity must be used to preserve the link during rain fade.

Rain diversity is a known technique in which two different hub antennas are placed far enough apart so that the rain fade at the two sites are not significantly correlated. While there is some probability that there is significant rain over both sites, this probability is much smaller if the distance between the sites is sufficiently large. The required distance depends on the local geography, elevation angle to the satellite, and transmission frequency, but is on the order of tens of kilometers or more.

Traditional rain diversity for satellite earth stations (particularly hubs of TDMA networks) use L-band over analog fiber to connect a single set of networking equipment to two different antenna systems, with an analog switch to control the selection of the active antenna.

Such a conventional L-band switching approach may provide a single interface to a terrestrial data network, as well as providing a "home" for protocol enhancement endpoints.

A satellite station (either the hub or remote terminal) has a functional block called a "modem". The purpose of the modem is to convert analog signals into digital data, and to convert digital data into analog signals. The analog signals are transmitted to, and received from, the satellite. The modem may be integrated into other hardware, and the transmit and receive functions of the modem may be split into separate functional blocks.

A typical prior art implementation of hub rain diversity involves converting the electrical analog signals into modulated analog signals on an optical fiber. While the signal is on optical fiber, it can travel long distances before being converted back to an electrical analog signal. This approach is illustrated in FIG. 1.

Figure 1:
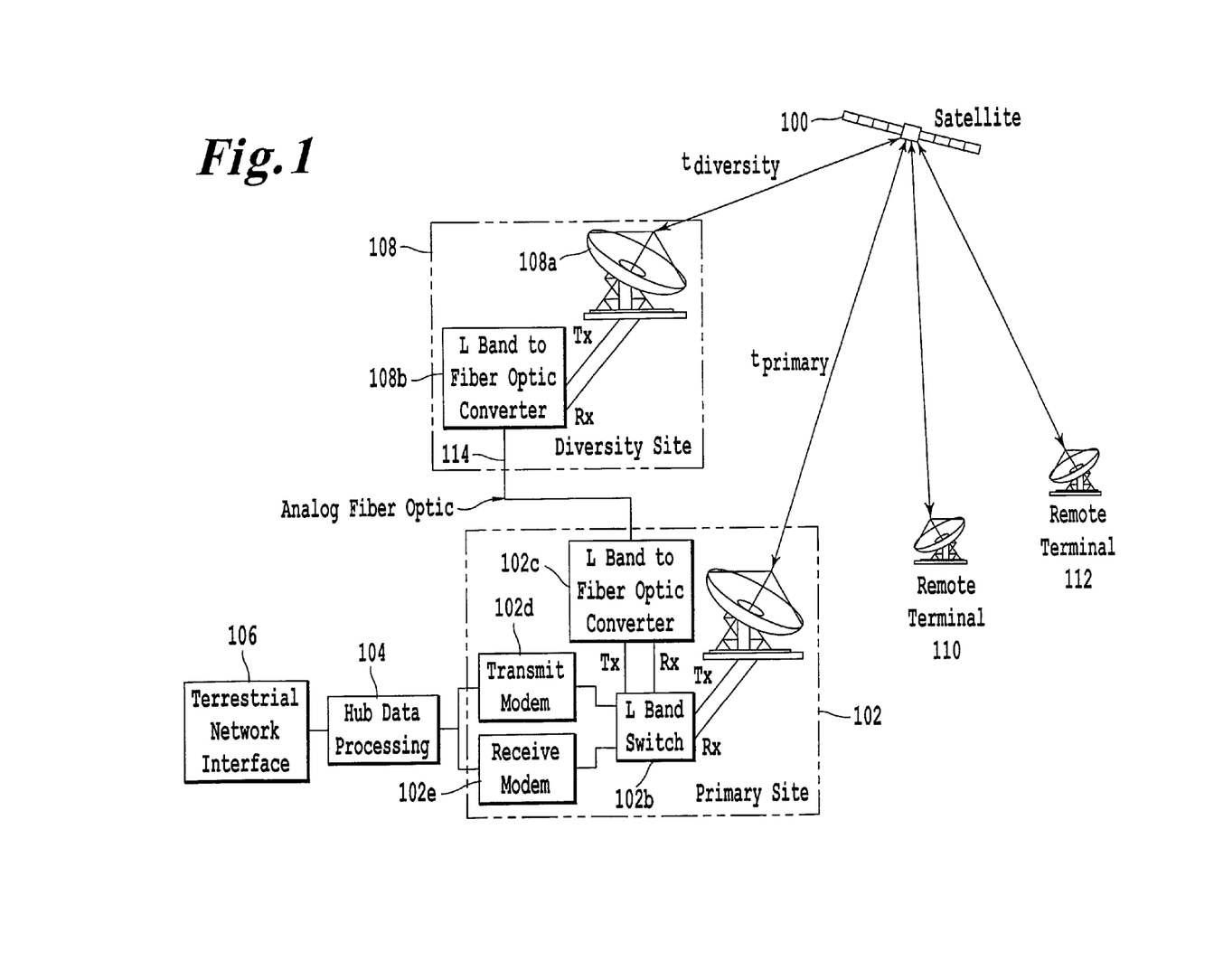
FIG. 1 illustrates a conventional rain diversity switchover system.

In FIG. 1, a satellite 100 is in communication with a primary site 102, diversity site 108, and user terminals 110 and 112. The primary site includes antenna 102a, L Band Switch 102b, L Band to Fiber Optic Converter 102c, transmit modem 102d and receive modem 102d. The diversity site includes an antenna 108a and L Band to Fiber Optic Converter 108b. In the primary site 102, the hub modem is split into the hub transmit modem 102d and a hub receive modem 102e, which are both controlled by a Hub Data Processing unit 104. The Hub Data Processing unit 104 is further connected to a Terrestrial Network Interface 106. According to some embodiments, the terrestrial network interface 106 is the connection between the remote terminals and the "outside world". For example, if a user at a terminal wanted to browse www.yahoo.com, the data would flow through the terrestrial network interface. Furthermore, while the terrestrial network interface 106 does not directly participate in the rain diversity switchover, the interface to the system, as seen from the terrestrial network interface 106, does not change when a switchover occurs.

The output of the hub transmit modem 102d is converted to an optical signal, and is transmitted over the analog optical fiber 114 to the diversity site 108. At the diversity site 108 it is reconverted to an electrical analog signal, which is passed to the RF electronics for frequency conversion, amplification, and transmission towards the satellite. The reverse path applies to signals received from the satellite. A switch is used to select either the primary antenna 102a or the diversity antenna 108a. This switch can be set either manually, or automatically based on measured fade conditions or other criteria.

This prior art solution has two significant weaknesses:
1) Because the signal is analog, there is a limit to how far it can be transmitted (even with intermediate amplification stages) before the signal quality degrades to the point of impacting the satellite link quality. In the current state of the art, this range is on the order of 100 km or less. Based on the local geography and weather patterns, the range may be insufficient to ensure the rain fades of the two sites are sufficiently uncorrelated. In addition, choosing a hub site has other constraints, including the cost of land, regulatory environment, local zoning laws, access to high bandwidth terrestrial data networks, etc. These constraints may make it difficult to find a suitable diversity site within the limited range of the diversity solution.
2) The solution requires a dedicated fiber run. This involves either finding a preexisting unused fiber that happens to run between the hub sites, which may not be convenient, or laying one specifically for the application, which may be expensive.

SUMMARY

According to some embodiments, a rain diversity switchover system includes a diversity Satellite Access Station (SAS) including a transmitter modem and a receiver modem in communication with a satellite via a first satellite antenna. The system further includes a primary SAS including a transmitter modem and a receiver modem in communication with the satellite via a second satellite antenna, where the transmitter and receiver modems of the primary SAS are synchronized with the transmitter and receiver modems of the diversity SAS via a common time source. A terrestrial digital network connecting the primary SAS to the diversity SAS. Further, a hub data processor adjusts a timing of transmissions from the diversity SAS to the satellite relative to the common time source in accordance with a difference between a time of flight from the diversity SAS to the satellite and a time of flight from the primary SAS to the satellite. Additionally, a switchover controller that controls, using the terrestrial digital network, a rain diversity switchover between the primary SAS and the diversity SAS.

According to some embodiments, a rain diversity switchover method includes measuring a rain fade level at a primary SAS including a transmitter modem and a receiver modem in communication with a satellite. The method further includes synchronizing the transmitter and receiver modems of the primary SAS with a transmitter modem and a receiver modem of the diversity SAS via a common time source, where the primary SAS is connected to the diversity SAS over a terrestrial digital network. The method further includes determining a time of flight from the diversity SAS to the satellite and a time of flight from the primary SAS to the satellite. The method further includes adjusting a timing of transmissions from the diversity SAS to the satellite relative to the common time source in accordance with a difference between the time of flight from the diversity SAS to the satellite and the time of flight from the primary SAS to the satellite. The method also includes executing rain diversity switchover from the primary SAS to the diversity SAS upon determination that the measured rain fade level at the primary SAS is below a predetermined threshold.

According to some embodiments, a non-transitory computer readable storage medium has executable instructions stored therein, which when executed by a processor in a digital rain diversity switchover system causes the processor to measure a rain fade level at a primary SAS including a transmitter modem and a receiver modem in communication with a satellite. The instructions further cause the processor to synchronize the transmitter and receiver modems of the primary SAS with a transmitter modem and a receiver modem of the diversity SAS via a common time source, where the primary SAS is connected to the diversity SAS over a terrestrial digital network. The instructions further cause the processor to determine a time of flight from the diversity SAS to the satellite and a time of flight from the primary SAS to the satellite. The instructions further cause the processor to adjust a timing of transmissions from the diversity SAS to the satellite relative to the common time source in accordance with a difference between the time of flight from the diversity SAS to the satellite and the time of flight from the primary SAS to the satellite. The instructions further cause the processor to execute rain diversity switchover from the primary SAS to the diversity SAS upon determination that the measured rain fade level at the primary SAS is below a predetermined threshold.

The disclosed embodiments include an improved method for providing rain diversity over much longer distances than conventional analog solutions, and providing much better continuity than conventional data packet rerouting solutions.

According to some embodiments, rain diversity between a primary and diversity site for a hub in a TDMA star network topology, using only standard data connectivity between the sites is provided. The data interruption during the switchover can be kept to less than one second. The solution does not require tight timing coordination between the two sites.

According to some embodiments, the data connectivity can be in the form of a standard Internet Protocol (IP) network, which is commonly deployed for terrestrial connectivity.

Embodiments provide a novel apparatus and method for baseband switching using an IP network. In an apparatus according to embodiments, two sets of modems are used, one at a primary site (i.e., Satellite Access Station, or SAS) and one at a diversity site. According to some embodiments, the term SAS refers to the combination of all ground segment entities including antenna, radio frequency subsystem (RFS), and satellite access equipment.

Embodiments maintain advantageously tight synchronization between plural sites and provide ability for accurate measurement of parameters including flight time delta between the two sides due to the geographic differences between primary and diversity SAS.

An embodiment provides a novel and relatively inexpensive solution to long distance (up to 1500 km) satellite earth station rain diversity using traditional IP networking to distribute system timing.

An embodiment includes a novel combination of GPS provided pulse per second timing signals and timing offset information communicated over an IP network to provide a continuous system timing as seen by remote satellite terminals.

An embodiment includes a novel IP based tunnel format to communicate data as well as timing to and from the rain diversity earth station. The diversity SAS is known as a rain diversity SAS. When a switch occurs, the current primary SAS becomes the diversity SAS. It is very unlikely two geographically disparate sites will experience the same rain fade; one site will always be better and will be designated the primary SAS.

An embodiment provides seamless rain diversity switching between satellite earth stations using a terrestrial data network backhaul instead of fiber optics carrying RF. The backhaul portion of a hierarchical telecommunications network includes the intermediate links between a core network, or backbone of the network, and a small sub-network at the edge of the entire hierarchical network. The backhaul portion is shown as the 10 Gpbs fiber link between SAS which carries IP data. This can be a traditional terrestrial IP network.

BRIEF DESCRIPTION OF THE DRAWINGS

A more complete appreciation of the present advancements and many of the attendant advantages thereof will be readily obtained as the same becomes better understood by reference to the following detailed description when considered in connection with the accompanying drawings. However, the accompanying drawings and their example depictions do not in any way limit the scope of the present advancements embraced by the specification. The scope of the present advancements embraced by the specification and drawings are defined by words of the accompanying claims.

DISCUSSION OF THE EMBODIMENTS

Referring now to the drawings, wherein like reference numerals designate identical or corresponding parts throughout the several views, and more particularly to FIG. 1 thereof, which shows a high level architecture of an embodiment.

Figure 2A:
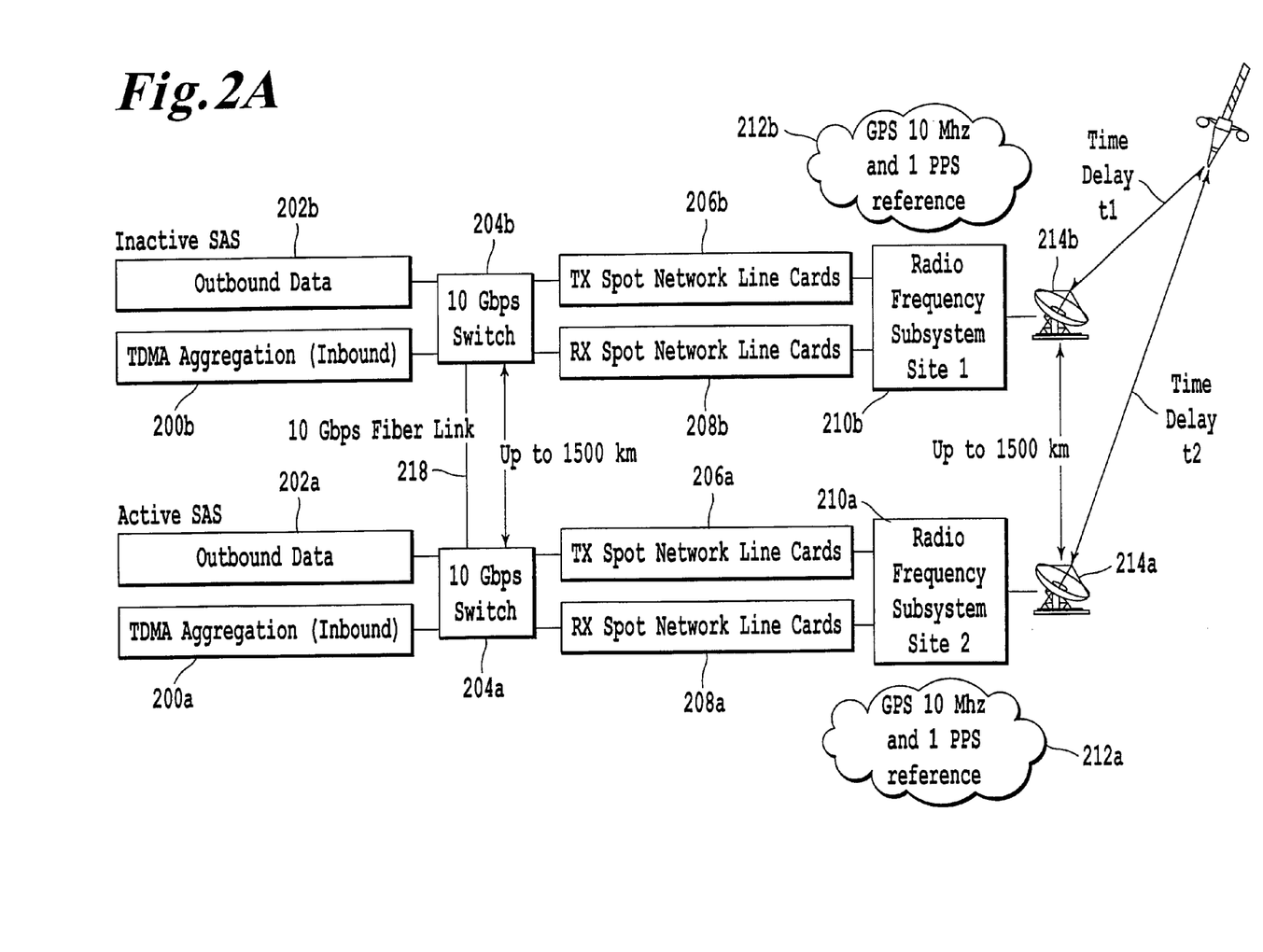
FIG. 2A illustrates an exemplary embodiment of a rain diversity switchover system.

According to the embodiment of FIG. 2A, a baseband switchover may be performed by redirecting data traffic in the form of data packets, for example IP data packets, in a tunnel format. This allows the use of a standard data network for connectivity between the two sites, greatly extended the range and lowering the cost of the diversity solution.

FIG. 2A shows a diversity SAS and a primary SAS, each comprising an outbound data component (202a, 202b), TDMA Aggregation (inbound) component (200a, 200b), a switch (e.g., a 10 Gbps IP switch) (204a, 204b), TX (206a, 206b) and RX (208a, 28b) Spot Network Line Cards, a respective Radio Frequency Subsystem Site (210a, 210b), and Antenna (214a, 214b) in communication with a common satellite 216.

According to some embodiments, the baseband switching apparatus and method makes switches not at the L-band, as in a conventional approach, but at the IP interface between the protocol processor subsystem (i.e., outbound data components/TDMA Aggregation (inbound) component) and the line cards. According to some embodiments, in FIG. 2A, the boxes marked "outbound data" (202a, 202b) and "TDMA aggregation" (200a, 200b) are components of the protocol processor subsystem, and the "outbound data" (202a, 202b) and "TDMA aggregation" (200a, 200b) components are the interfaces for all IP traffic going over the air to and from the satellite terminals. In further embodiments, the line cards themselves generate timing data which is injected as data packets in the outbound direction.

According to some embodiments, the protocol processor executes code that controls the switching of the network switches as discussed below. Each SAS includes a protocol processor comprising one or more protocol processor servers, which contain the outbound data and TDMA aggregation components. In alternative embodiments, the protocol processor includes hardware to control the switching of the network switches as discussed below.

In further alternative embodiments, the baseband switching capability is provided with a dual backup primary SAS.

In the embodiment of FIG. 2A, the link labeled "10 Gbps Fiber link" 218 provides IP connectivity between the two 10 Gbps switches shown. In some embodiments, the link has a latency of 40 ms or less, with less than 1 ms of jitter. In further embodiments, the link supports the full data rate for a single satellite, for example, 5 Gbps in each direction.

In this embodiment, the line cards are configured with the same carrier configuration in each site. As an example, the two transmit line cards (206a, 206b) are time synchronized. However, during switchover, one line card is muted (i.e., stop transmitting) while the other one is unmuted (i.e., starts transmitting). In some embodiments, the transmit line card that is unmuted continuously outputs outbound DVB-S2 carriers. DVB-S2 is a digital satellite transmission system known to those of ordinary skill in the art and is specified in the European Standard (Telecommunications Series) 302 307 V1.2.1 (2009-08), the entire contents of which are incorporated herein by reference. This configuration allows continuous monitoring of the carriers from the RFS with the unmuted transmit line card, if desired. In some embodiments, the transmit line card is not muted, but the signal is suppressed in the RFS. This allows for active monitoring of the unused DVB-S2 carrier. The RFS (210a, 210b) provides a link between the antenna (214a, 214b) (Ka-band) and satellite access equipment (intermediate frequency). A main function of the RFS (210a, 210b) is to provide high power amplification, low noise amplification, and up/down conversion between Ka-band and IF.

According to some embodiments, receive line cards (208a, 208b) continuously receive, demodulate, and decode incoming TDMA bursts, although the TDMA bursts may not be forwarded beyond the TDMA aggregator (200a, 200b). For example, diversity RX line card 208b may forward the bursts to the diversity TDMA aggregator, but the aggregator does not forward it further. In some embodiments, the RX line card 208b, even though it is not forwarding data, can report that the data is being received properly, which serves as an active verification that the system timing adjustment is properly done before the switchover occurs.

According to some embodiments, the timing between both sets of line cards (206a, 208a, 206b, 208b) is synchronized by using common pulse per second (PPS) signals generated from a GPS receiver (212a, 212b) included in the RFS (210a, 210b), and by communicating over IP. In some embodiments, the synchronization is determined by obtaining the time from the GPS receiver (212a, 212b). In additional embodiments, the terrestrial network, which is an IP network in some embodiments, is used to have both the primary site and diversity site agree on the time for the next pulse.

In some embodiments, the timing between the primary and diversity sites is offset by t2-t1 (i.e., the path delay from SAS to satellite, which is different for each geographically separated SAS), so that when a switchover occurs, a Network Clock Reference (NCR) time as seen by the satellite terminals is continuous. The timing is also offset to enable the RX line card (208a, 208b) of both sites to simultaneously receive the same TDMA burst transmitted by a given remote terminal. The NCR includes timing information sent on the outbound carrier that the remote satellite terminals use to synchronize their transmission back to the SAS.

According to an embodiment, the RFS (210a, 210b) provides the respective SAS with the following information: (1) When an RFS switchover is to occur; (2) 1 PPS and 10 MHz signals to the two sites which are synchronized, preferably within 1 microsecond or better; and (3) Real time measurements for the delay from the L band ports to the satellite—i.e., t1 and t2, which are known, for example, with an accuracy of better than 1 microsecond. In additional embodiments, common mode error is acceptable, where if both measurements are off by a common amount, system operations are not affected.

Figure 2B:
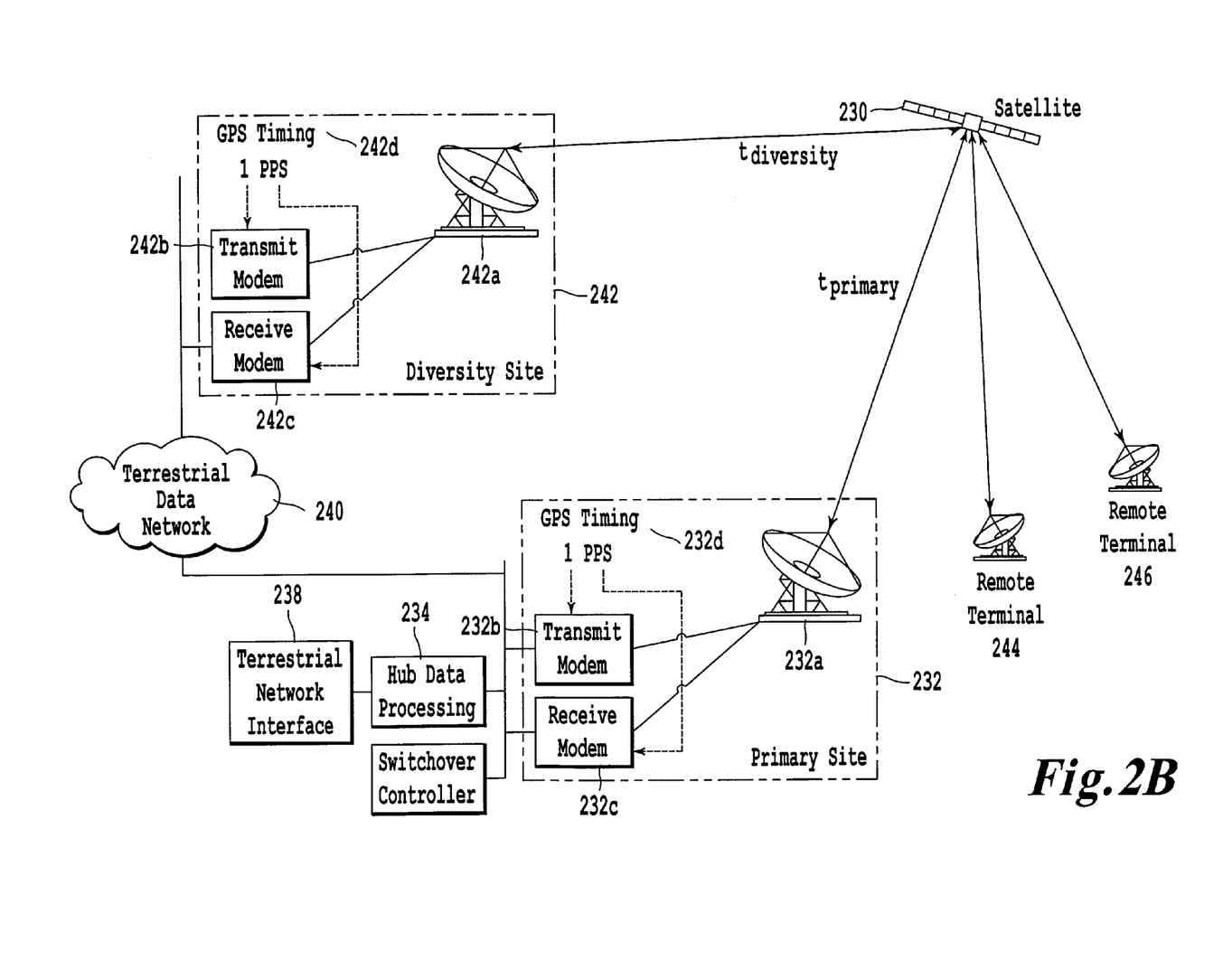
FIG. 2B illustrates an exemplary embodiment of a rain diversity switchover system.

FIG. 2B illustrates an additional embodiment. As illustrated in FIG. 2B, there are two sites, the "primary" site 232 and the "diversity" site 242. The primary site 232 is the site that happens to be unmuted; once a switchover has occurred, the roles of the two sites are switched. The primary site 232 and diversity site 242 are in communication with satellite 230. Further, the satellite 230 is in communication with remote terminals 244 and 246. A terrestrial data network 240 is included between the diversity site 242 and the primary site 232. The primary site 232 and diversity site 242 each include an antenna (232a, 242a) a receive modem (232c, 242c), a transmit modem (232b, 242b), and a GPS receiver that receives a common GPS timing reference (232d, 242d). The transmit modem 232b and receive modem 232c are connected to a hub data processing unit 234 and switchover controller 236. As an example, the hub data processing unit 234 is a processor and performs the functions of the protocol processor described with respect to FIG. 2A. Furthermore, the switchover controller 236 determines when communications with the primary site 232 should be switched over to the diversity site 242. According to some embodiments, the switchover controller 236 is a software controller. In further embodiments, the switchover controller 236 is implemented in hardware or as a hardware/software combination. The hub data processing unit 238 is connected to a terrestrial network interface 238, which is a common network interface for both the primary and diversity sites.

According to some embodiments, rain diversity switchover occurs between hubs using standard terrestrial data links, with data outage times of less than one second. The hubs are designated the "primary" and "diversity" hubs. According to some embodiments, both hub sites (232, 242) have a time reference which is synchronized to a common source, such as the global positioning system. This time reference provides a pulse per second to the modems. In further embodiments, the modems (232b, 232c, 242b, 242c) are locked to the time reference and control the system timing on the physical channel. The transmit modem (232b, 242b) maintains a clock which is locked to the time reference, and embeds time stamps in the outbound carrier. The time stamps are used by the remote terminal to reconstruct the system clock.

Furthermore, the data to and from the remote terminals pass through a terrestrial network interface (238) at one of the sites. This provides a common interface point to the terrestrial network, which makes the switch transparent to the remote terminals and a computer communicating with the remote terminals over the terrestrial network. As illustrated in FIG. 2B, the sites 232 and 242 are connected by the terrestrial data network 240. As an example, the terrestrial data network 240 can be the same physical network which connects the terminal to the rest of the terrestrial network, but is a logically distinct connection. The latency of the connection is not critical, allowing for large distances between the hubs. Moreover, the switchover controller 236, which is a software process in some embodiments, manages the rain diversity switchover.

Additionally, the time delay for signal propagation between the primary hub 232 and the satellite 230, and the diversity site 242 and the satellite 230, can be measured with high accuracy. This can be done, for example, by using a spread spectrum ranging device. As an example, the measurement of the time delays to the satellites are more accurate than the guard spacing between the TDMA bursts. In a normal TDMA network, there is a defined "guard time" between TDMA bursts to allow the small timing variations in the return channel. This guard time is required because the timing correction loop between the remote and the hub is slow (in part because of the round trip time delay to the satellite). The guard time allows the system to absorb timing errors caused by changes in the round trip delay time (due to both satellite motion and terminal motion). The measurement of the time delay between the hub sites and the satellites is more accurate than this guard time. Given typical guard times for TDMA networks, and given the accuracy of measurement devices, having the time delay measurement more accurate than the guard time is achievable.

The switchover from the primary site 232 to the diversity site 242 is made nearly (i.e., substantially) seamless by two things. First, the hub side modems at the primary 232 and diversity site 242 are adjusted so that the physical channel seen by the remotes does not change when the switch occurs. This allows the recovery time to be limited to the time to achieve "physical outbound lock," which is described below. Second, the terrestrial network interface 238 doesn't change when the switch occurs. No IP routing updates need to be made on the terrestrial side. Therefore, no packet loss occurs and no rerouting is required.

To understand how the channel is made to appear seamless from a switchover point of view, it is first important to review how a typical TDMA system becomes synchronized. There are uncertainties in the channel which must be compensated for in order to achieve efficient communications. These uncertainties include:

The fade conditions on the channel
The round trip time delay
Frequency error on the channel (due to, for example, the satellite frequency converter) In order to measure these correctly, the clocking between the hub and remote needs to be synchronized as well, as the oscillators on the remote are typically not accurate enough to be run uncorrected.

The synchronization between the remote and hub to compensate for the channel uncertainty occurs, in some embodiments, as follows:

1) The transmission of the continuous outbound begins (or the remote terminal becomes active).
2) The receiver on the remote terminal achieves symbol lock on the continuous outbound, at which point it can successfully decode data. This is a fast process, typically taking less than a second.
3) The receiver on the remote terminal looks at timestamps inserted into the data stream by the hub transmit modem to synchronize its clock to the hub clock. (This is known as achieving "timing lock".)
4) The remote terminal sends an "acquisition" burst into a dedicated timeslot, which allows the hub to measure the residual timing, frequency, and power offset of the remote. This burst slot is specially designed to allow a large time offset.
5) The hub sends a correction to the terminal for the transmission time, frequency, and power.
6) The terminal is now synchronized and capable of using data slots. The channel can space the data slots much more closely than the initial channel uncertainty, because the hub continuously measures the timing errors on the bursts and sends timing corrections to the remote terminal.

According to some embodiments, time slots are assigned by the "hub data processing" element. They are assigned to remotes based on demand from the remote signals on the inbound transmissions. In some embodiments, the assignment of time slots to the remotes are done by generating and transmitting "burst time plan" messages (BTPs) from the hub data processing element to the transmit modem. The transmit modem sends these messages to the remotes. This technique is well known to one skilled in the art.

In some embodiments, the mechanics of the switchover occurs as follows. In the following description, it is assumed that the path length from the diversity hub to the satellite is longer than the path length from the primary hub to the satellite. However, the scheme works equally well in either case. Because the time measured from the GPS is very accurate, and the measured range to the satellite is very accurate, the connection between the two sites on the terrestrial side does not need to maintain tight timing synchronization. The latency simply needs to be low enough so that control messages can be delivered in a timely fashion. However, this can accommodate a relatively long latency—many tens of milliseconds—so that the constraint on the terrestrial network is easily met with commercially available equipment and infrastructure.

In some embodiments, the time of flight from the primary hub to the satellite is $t_{primary}$, and the time of flight to the diversity hub is $t_{diversity}$. The time of flight refers to the time it takes for a signal to travel from the hub to the satellite. Further, $\Delta t = t_{diversity} - t_{primary}$, where $\Delta t$ varies over the course of a day due to imperfections in the satellite orbit. According to some embodiments, $t_{diversity}$ and $t_{primary}$ can be measured using external equipment such as a spread spectrum ranging device. However, $\Delta t$ can also be measured by observing the timing of the TDMA bursts being received at the diversity site. For example, if a burst is detected exactly 120,000 microseconds after the PPS signal at the primary site, and the same burst is detected 123,000 microseconds after the PPS signal at the diversity site, then $\Delta t$ is 123,000-120,000=3,000 microseconds.

In additional embodiments, the rain fade at the two sites can be measured directly by comparing the measured C/N of bursts detected at both sites. This relieves the need for an independent system to measure the rain fade at the two sites, which is required for an automated rain diversity switchover. The difference can be used simply to monitor the fade, or can be used as the decision criteria for executing the switch. By measuring the same burst detected at both sites, and averaging the difference of the C/N for all bursts simultaneously received at both sites, accurate measurement of the downlink fade can be achieved. For example, if bursts 1,2,3,4 . . . are received, the difference in link is computed by taking the average of (C/N of burst 1 at the primary receiver—C/N of burst 1 at the diversity receiver), (C/N of burst2 at the primary receiver—C/N of burst2 at the secondary receiver), etc. In some embodiments, if the computed average difference for all bursts simultaneously received at both sites is above a predetermined threshold, then the decision to execute the rain fade switch is made.

According to some embodiments, only $\Delta t$ is needed for the system to operate properly. The choice to use external equipment (which is commercially available) is made based on different factors. The use of the TDMA burst monitoring requires less additional equipment. However, the additional equipment may be available for other utilities at the primary and diversity sites. Therefore, using the external equipment may not increase the incremental cost. In addition, the use of measurement equipment requires the use of a "loopback" path (where a signal transmitted from the hub can be received at the hub). When such a loopback path is unavailable, either because the satellite does not have one or the hub operator is not authorized to use it, the TDMA burst monitoring method is the only viable solution of the two presented. In some embodiments, primary and diversity sites have the capability to use external equipment to measure $\Delta t$ and observe TDMA bursts. In this regard, when the loopback path is not available, the sites switch to observing TDMA bursts to determine $\Delta t$.

The operation of the system is described in the following sections. According to some embodiments, in the "preswitchover" state, adjustments are made to the diversity modems to prepare the system for the switchover. These adjustments can either be made immediately prior to switchover, or continuously (i.e., periodically).

According to some embodiments, before a switchover occurs, the data is forwarded to and from the primary hub over the satellite to the remote terminals. Referring to the embodiment of FIG. 2B, the primary hub modem transmitter 232b is locked to the GPS timing reference. The diversity hub modem transmitter 242b timer is also locked to the GPS timing reference, but the time of the transmitter is set so that the timestamp is emitted earlier by $\Delta t$, and the transmission is muted. The diversity hub modem receiver 242c (or simply "diversity receiver"), which is receiving TDMA bursts, is set so that the receive window is delayed by $\Delta t$. In this embodiment, the receiver is always actively receiving bursts, but is not sending the demodulated data to the terrestrial network interface.

Figure 3A:
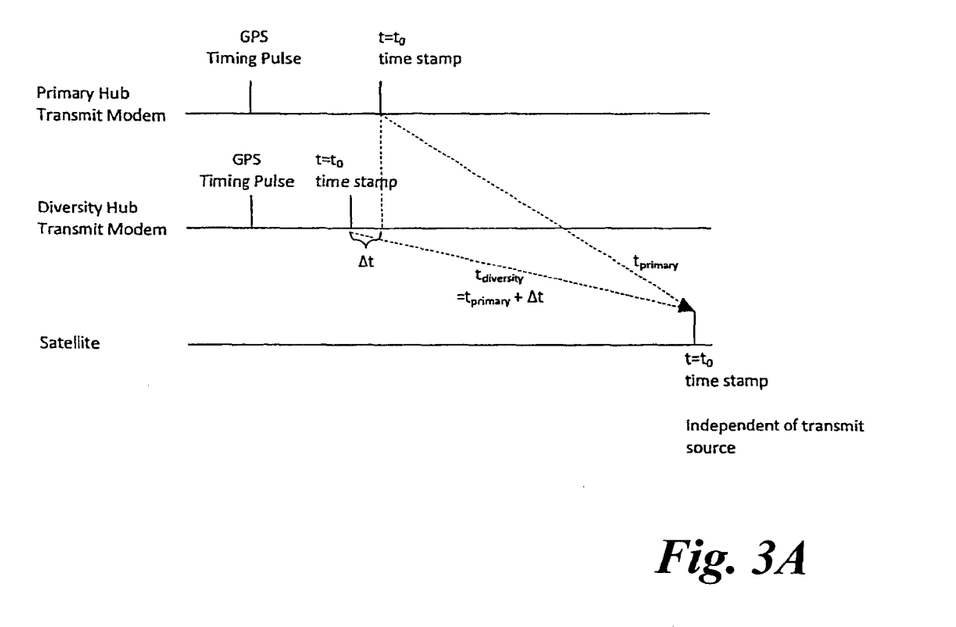
FIG. 3A illustrates an exemplary timer adjustment at the transmit modem of the diversity site.
Figure 3B:
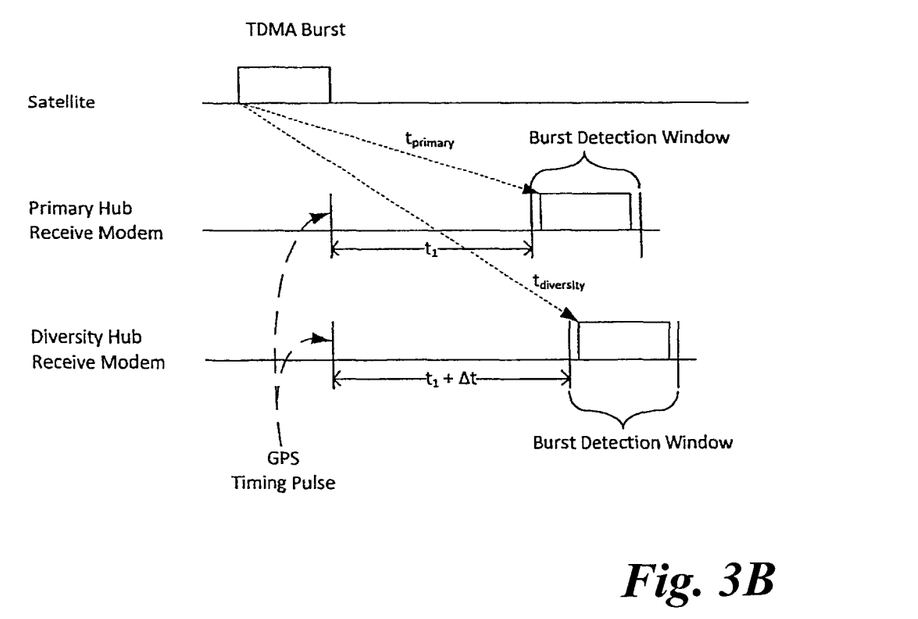
FIG. 3B illustrates an exemplary timer adjustment at the receiver modem of the diversity site.

FIG. 3A illustrates the primary hub transmit modem 232b and diversity hub transmit modem 242b receive the GPS timing pulse at the same time. In this regard, both the primary hub transmit modem 232b and diversity hub transmit modem 242b are synchronized to a common timing reference. FIG. 3A further illustrates that the outbound time stamp on the outbound signal from the diversity hub transmit modem 242b is put on at an earlier time by $\Delta t$ with respect to the outbound time stamp on the outbound time signal from the primary hub transmit modem 232b. In alternative embodiments, the outbound time stamp on the outbound time signal from the diversity hub transmit modem 242b could also be put on at the same time as the outbound time stamp on the outbound time signal from the primary hub transmit modem 232b, but with a value of the time delayed by $\Delta t$ in the timestamp. The timer adjustment for the outbound channel (from the hub to the satellite) is shown in FIG. 3A, and the timer adjustment for the TDMA return bursts is shown in FIG. 3B. Particularly, in FIG. 3B, the TDMA Burst from the satellite 230 is received at the primary hub receive modem 232c at time $t_1$ and at the diversity hub receive modem 242c at time $t_1$ plus $\Delta t$.

The advantages of the time adjustments illustrated in FIGS. 3A and 3B are such that if the diversity transmitter 242b were to be unmuted, the time stamps on the outbound signal from the diversity transmitter 242b would arrive at the satellite at the same time as the timestamps from the primary site 232. Therefore, after rain diversity switchover from the primary site 232 to the diversity site 242, reacquisition of synchronization between the remote terminal and diversity site is not required. As illustrated above, in some embodiments, the time stamps are put on the outbound at an earlier time on the diversity site by $\Delta t$ to accomplish this. Furthermore, the diversity receiver 242c, which must detect the received TDMA bursts within the correct time window, receives the bursts properly because the receiver time window (i.e., burst detection window) is adjusted so that the detection aperture time of the receiver will be correct. Because the diversity modem receiver 242c is active, it both ensures that any receiver control loops (such as automatic gain control) are stable, as well as providing positive assurance of readiness to switch. For example, since the diversity modem receiver 242c remains active prior to switchover, the diversity modem receiver 242c may send a signal to the switchover controller 236 indicating that TDMA bursts are properly received at the diversity site 242. When the switchover controller 236 receives this signal, the switchover controller 236 has positive assurance that the diversity site 242 is ready to handle a switchover. In addition to adjusting the time offsets, it is also important that clock rates from the modems at the primary site 232 and diversity site 242 are the same, as they are both locked to the common timing source. This feature allows for a rapid resynchronization upon switching from the primary site 232 to the diversity site 242.

Synchronization of the switchover between the RFS and the SAS equipment is less critical according to the present embodiments than in a conventional L-band switching scheme, because the timing is continuously maintained at the two different sites. Imperfect synchronization according to an embodiment may lead to data loss, but will not cause satellite terminals to lose the physical link. Additionally, according to embodiments, the delay over the fiber link is not part of the physical timing loop, and does not need to be known as long as it remains within predetermined timing specifications. In this regard, the time delay over the data link isn't part of the over the air timing that needs to be corrected. The over the air timing correction is between the transmit modem, satellite remote modem, satellite, and receive modem. The data link is not part of this loop. Therefore, timing over the data link is not critical for timing correction. Because the SAS is replicated at the diversity site, the user traffic may be delayed during switchover, but it doesn't cause any disruption to the satellite network operation.

Figure 4A:
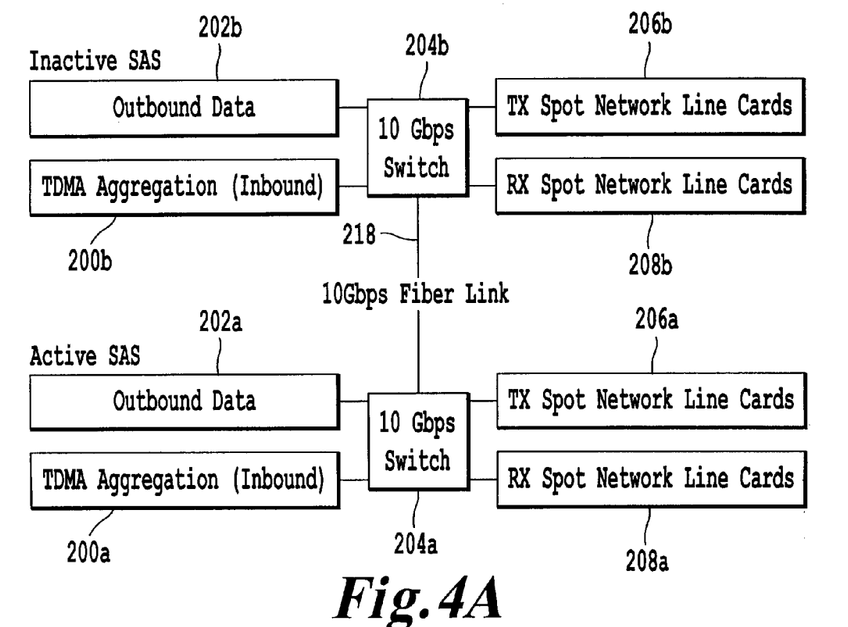
FIGS. 4A and 4B illustrate an exemplary embodiment of using line cards before and after switchover, respectively.
Figure 4B:
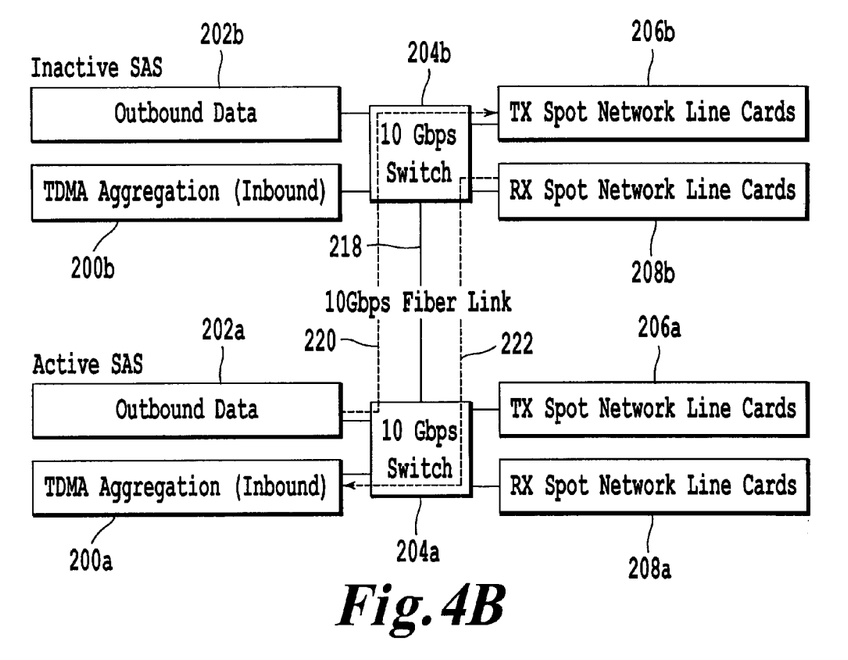

FIG. 4A shows an embodiment while operating in a nominal state, using the line cards co-located with the hub data processing. FIG. 4B shows the same embodiment after a switchover, in which the line cards from the diversity site are being used.

When the switchover controller determines it is time to switch to the second antenna, the following sequence of events occurs.

1. The switchover controller informs the SAS equipment of the primary site that the switch is going to occur.
2. The outbound data processors switch to sending tunnel packets to the other diversity site's Transmit line cards 206b.
3. The current site's (i.e., the primary site, which is the one that is presently being used) TDMA aggregation process stops forwarding data packets. Both primary and diversity SAS's RX line cards (208a, 208b) continue to receive data from the satellite, but at the switchover time, the primary SAS stops processing this data and the diversity SAS takes over and becomes the primary SAS.
4. The other site's receiver line cards 208b begin forwarding data packets to the TDMA aggregation processor of the former primary site.

According to some embodiments, packet duplication is avoided in the outbound direction because an outbound packet is only sent to a single line card. In the inbound direction, the receive line cards may be tightly synchronized in time, so the switchover time can be defined between one TDMA burst and the next. This prevents packet duplication in the return direction.

TDMA bursts are arranged in frames having a frame boundary over which no TDMA packets cross. According to some embodiments, the switchover is scheduled for a specific frame boundary, where any bursts received before the specific frame boundary are forwarded, and bursts received after the specific frame boundary are not forwarded.

The pre-switch configuration is shown in FIG. 4A, and the post switch configuration is shown in FIG. 4B. As illustrated in FIG. 4A, the outbound data processor 202a forwards data 220, through the switch 204a, to the transmit line cards 206a, which is subsequently forwarded to the satellite. Furthermore, the TDMA aggregation processor 200a receives data 222, through the switch 204a, from the receive line cards 208a. However, after the primary to diversity switch, the outbound processor 202a of the former primary site is forwarded over the fiber link 218 to the transmit line card 206b of the current primary site. Furthermore, as illustrated in FIG. 4B, data received by the receive line card 208b of the now primary site is forwarded over the fiber link 218 to the TDMA aggregation processor 200a of the former primary site. This data may represent data transmitted from a remote terminal that is forwarded to a computer on the terrestrial network.

According to an embodiment, the SAS that is the primary site is defined to be in a nominal state (i.e., preferred site). However, after the rain fade switch, the diversity site is not considered to be the preferred site in this embodiment. For example, after a predefined grace period following the switch, the system switches back to the primary site at the very first available opportunity. In this embodiment, the switch from the primary site to the diversity site requires a threshold delta between the fade levels of both sites (i.e., the fade level at the primary site falls below a predetermined threshold, and the fade level at the diversity site is above the predetermined threshold). However, switching back from diversity to primary has no threshold. For example, switchback happens as soon as fade levels of the primary site are better than the diversity site. Hence, in this embodiment, the primary site is the favored site. In additional embodiments, the decision to switch from the diversity site to the primary site is made by a manual operator.

According to some embodiments, the decision to switch is made based on measured rain fade on the primary link relative to the diversity link. For example, if the measured rain fade at the primary site is below a predetermined threshold, and the measured rain fade at the diversity site exceeds the predetermined threshold, the decision to execute the switch is made. As another example, if the measured rain fade at the primary site compared to the measured fade at the diversity site exceeds a predetermined ratio, the decision to execute the switch is made. In further embodiments, the decision to execute the switch is based on a manual operation. For example, an administrator of the satellite communication system can perform a manual operation that instructs the switchover controller to execute the switch from the primary site to the diversity site. In additional embodiments, the decision to execute the switch is based on predicted weather conditions. For example, when predicted weather conditions at a predetermined time indicate that the measured rain fade at the primary site will fall below the predetermined threshold, the decision to execute the switch at the predetermined time is made. Further, any desired combination of these embodiments may be used to determine when to execute the switch from the primary site to the diversity site. The optimal mechanism to determine when to execute the switch depends on the operation needs of the user. According to some embodiments, once the decision to switch has been made, the switchover controller coordinates the switchover.

Figure 5:
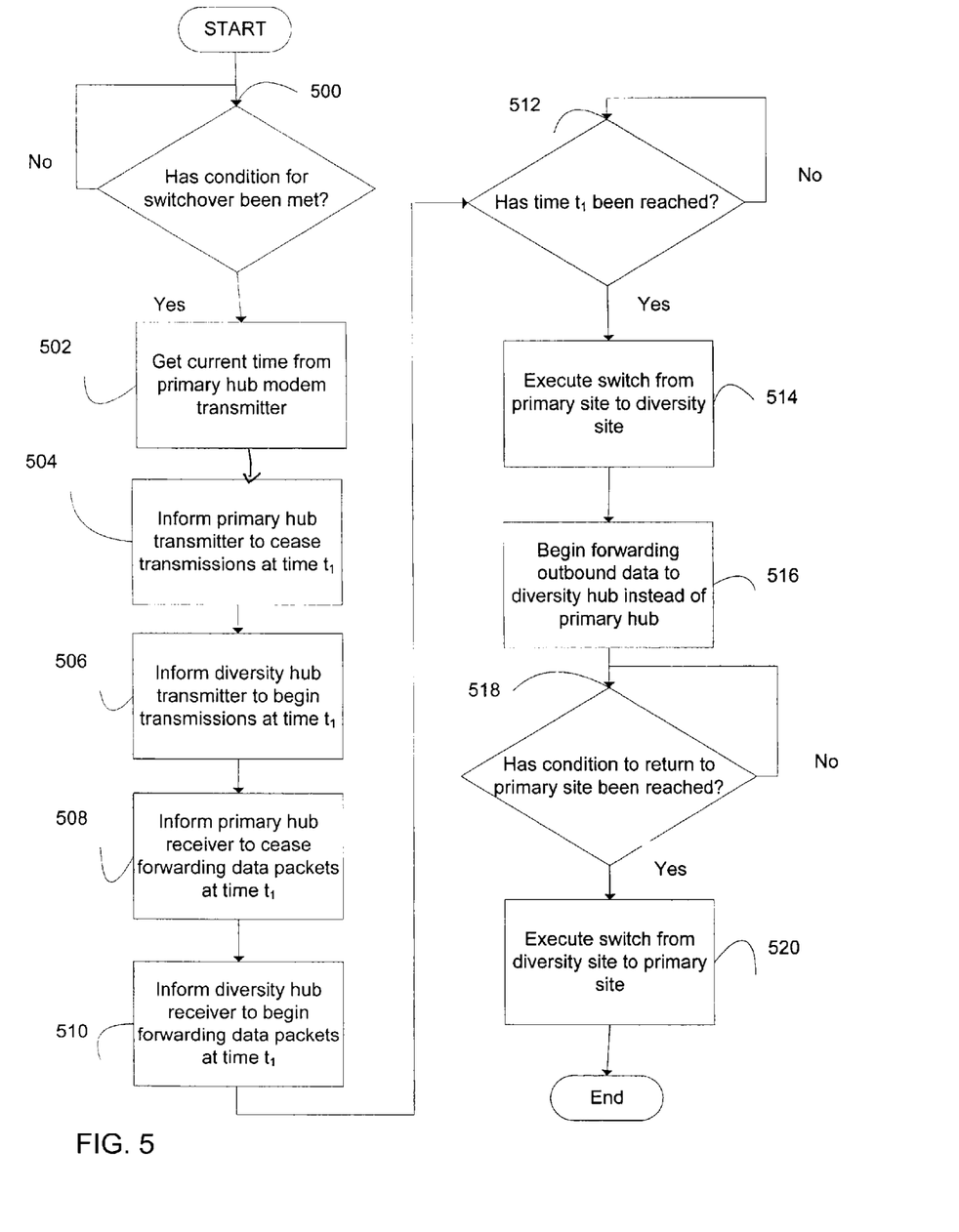
FIG. 5 illustrates an exemplary process for performing rain diversity switchover.

FIG. 5 illustrates an embodiment of an example process of executing the switchover from the primary site to the diversity site. According to some embodiments, the process starts at 500 to determine if the condition for switchover has been met. For example, as discussed above, the condition for switchover is met when the measured rain fade at the primary site 232 is below a predetermined threshold, and the measured rain fade at the diversity site 242 exceeds the predetermined threshold. If the condition for switchover has not been met, process flow repeats at step 500.

However, if the condition for switchover has been met, process flow proceeds from 500 to 502 to get the current time from the primary hub modem transmitter. For example, the switchover controller 236 gets the current time from the primary hub modem transmitter 232b (or, alternatively, from a separate GPS interface or other timing source). Process flow proceeds from 502 to 504 to inform the primary hub transmitter to cease transmissions at time $t_1$. For example, the switchover controller 236 informs the primary hub modem transmitter 232b to cease transmissions at some future time $t_1$, and receives an acknowledgement from the primary hub modem transmitter 232b. According to some embodiments, $t_1$ is determined by how long it takes the switchover controller to instruct components of the SAS (i.e., the line cards and software processes) that a switchover needs to occur. For example, the switchover controller needs to instruct four line cards to perform an action all at precisely the same time (e.g., one starts transmitting, one stops transmitting, one starts forwarding TDMA bursts, one stops forwarding TDMA bursts). Accordingly, the switchover controller instructs each of the line cards when to perform these actions (i.e., time $t_1$) and receives an acknowledgement from each of the time cards. Since each of the cards have precise clocks that are synchronized to a common time reference, these actions are performed at the same time.

Process flow proceeds from 504 to 506 to inform the diversity hub transmitter to begin transmissions at time $t_1$. For example, the switchover controller 236 informs the diversity hub modem transmitter 242b to begin transmissions at $t_1$, as determined by the diversity hub modem transmitter's 242b local clock. Furthermore, this time can be slightly delayed to ensure there are not simultaneous transmissions to the satellite, although this gap time can be on the order of microseconds or less.

Process flow proceeds from 506 to 508 to inform the primary hub receiver to cease forwarding data packets at time $t_1$. For example, the switchover controller 236 informs the primary hub receiver 232c to cease forwarding data packets at time $t_1$ to the hub data processing unit 234. As another example, the RX line cards 208a of the primary site are instructed to cease forwarding data packets at time $t_1$ to the TDMA aggregation processor 200a.

Process flow proceeds from 508 to 510 to inform the diversity hub receiver to begin forwarding data packets at time $t_1$. For example, the switchover controller 208a informs the diversity hub receiver 242c to begin forwarding data packets at time $t_1$, as determined by the diversity hub modem receiver's local clock. As another example, the RX line cards 208b of the diversity site are instructed to begin forwarding data packets at time $t_1$ to the TDMA aggregation processor 200b.

Process flow proceeds from 510 to 512 to determine whether time $t_1$ has been reached. If time $t_1$ has not been reached, process flow repeats 510. If time $t_1$ has been reached, process flow proceeds from 512 to 514 to execute the switch from the primary site to the diversity site. Process flow subsequently proceeds to 516 to begin forwarding outbound data to the diversity hub instead of the primary hub. For example, at time $t_1$, the hub data processing unit 234 begins forwarding the outbound data to the diversity hub instead of the primary hub. In some embodiments, the hub data processing unit 234 starts the forwarding of the outbound data to the diversity hub based on either an internal clock, or based on a triggering signal from one of the primary modems (either receiver or transmitter).

When time $t_1$ arrives, the diversity site becomes the primary site while the primary site becomes the diversity site. In this regard, in some embodiments, the primary site transmitter is muted, and the receiver ceases forwarding data packets. From the point of view of a remote terminal, a brief interruption of the outbound is seen. Before the interruption, the signal is coming from the primary hub, as illustrated in FIG. 4A, and after the interruption, it is coming from the diversity site, as illustrated in FIG. 4B. However, because both transmitters are locked to a common clock, the symbol rate and frequency of the outbound signal experiences only a minimal change, allowing a fast relock on the carrier. In this regard, the frequency and symbol rate seen at the terminal receiver after the switch are very close because both transmitters are locked to a common clock, which allows a fast relock on the carrier.

Once the outbound resumes, the remote terminal receives timestamps. The time stamps are synchronized to allow the clock recovery loop to maintain lock and provide continuous clocking through the transition. In this regard, since the outbound time stamps are delayed by Δt, the remote terminal receives the time stamps from the current primary site (i.e., former diversity site) at the same time the time stamps from the former primary site would have been received. This will synchronize the time stamps from the point of view of the receiving terminals. Further, the timing constraints between the hub data processing unit and the diversity site are relaxed. In this regard, the control messages have to arrive in a timely fashion, but the exact time of arrival is unimportant as long as the time of arrival is bounded.

At this point, the switchover is completed. In an alternative embodiment, the time on the two transmitters is not synchronized, but the time difference is measured and signaled to the remote on the new outbound channel when it is transmitted. This alternative embodiment would allow the remote terminal to automatically adjust its internal clock in an instantaneous fashion.

Process flow proceeds from 516 to 518 to determine whether the condition to switch back to the primary site has been reached. For example, when the measured rain fade at the primary site is less than the diversity site, the condition to switch back to the primary site has been met. If the condition to switch back to the primary site has not been met, process flow repeats 518. If the condition to switch back to the primary site has been met, process flow proceeds to 520 to execute the switch from the diversity site to the primary site. According to some embodiments, the process illustrated in FIG. 5 ends at 520.

According to some embodiments, while the process illustrated in FIG. 5 is performed, the hub data process continues to generate burst time plans (BTPs). The BTPs use the same data communication between the hub data processing element as the normal data. As soon as a remote terminal is decoding the outbound data, the terminal receives and processes BTPs, causing it to transmit TDMA bursts. BTPs are well known by one of ordinary skill in the art and disclosed in U.S. Pat. No. 7,215,652, the entire contents of which are incorporated by reference. Because the TDMA bursts are sent from the remote terminals at times derived from the recovered clock, the timing of the bursts remains properly synchronized as transmitted from the remote. The diversity and primary receive modems continue to receive the bursts, but only the diversity receive modem forwards the bursts after the switchover time. If the diversity site experiences significant rain fade, the diversity site would not properly receive the bursts because of the signal degradation. Accordingly, in further embodiments, if neither the primary site nor the diversity site can properly receive TDMA bursts due to rain fade, an additional diversity site is used to receive the TDMA bursts.

Figure 6:
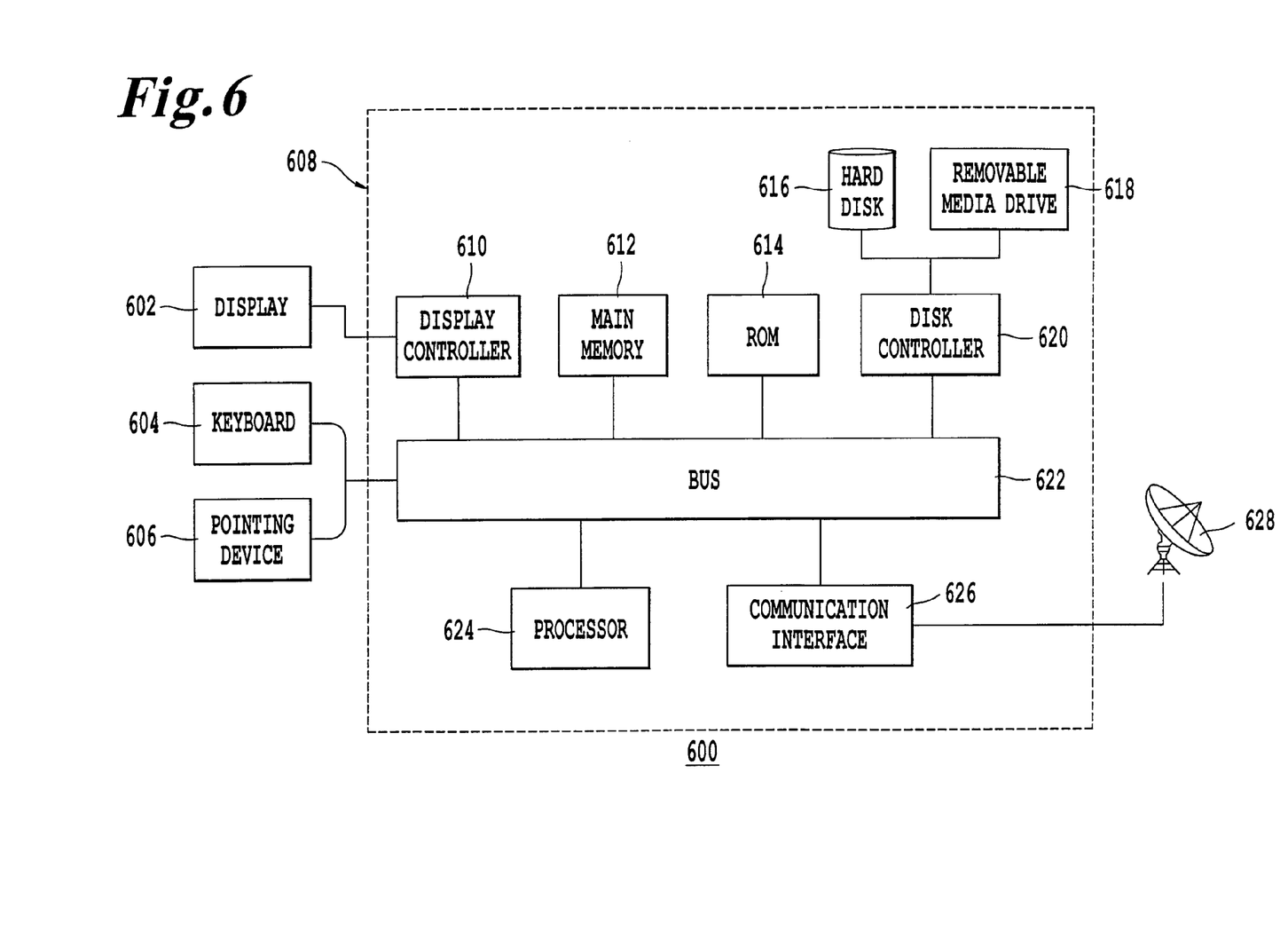
FIG. 6 illustrates an exemplary hardware configuration.

FIG. 6 illustrates an embodiment of a hardware configuration 600 of the hub data processing unit 234, switchover controller 236, transmit and receive modems, and/or the user terminals 244 and 266 in FIG. 2B in which the present embodiments are implemented. Alternatively, other manners of implementing the present embodiments would be understood by one having ordinary skill in the art, and are also included within the scope of the embodiments. For example, the present embodiments may be implemented using hardware without software, firmware, or combinations of hardware, software, and firmware. The hardware configuration 600 includes a general purpose computer 608 including a bus 622 that connects a display controller 610, a main memory 612, a Read Only Memory (ROM) 614, a disk controller 620, a general purpose arithmetic processor 624, and a communication interface 626. The disk controller 620 interfaces several computer readable mediums to the bus 622, such as a hard disk 616 and a removable media drive 618. A user may interface with the general purpose computer 608 via a display 602, a keyboard 604, and a pointing device 606. The display controller 610 renders images provided to the display 602.

The communication interface 626 connects to an antenna 628 for communication over a satellite network. Thus, the communication interface 626 includes receivers and transmitters for communication over a satellite network, such as hardware circuit components necessary to up-convert a frequency and/or phase modulated carrier signal to a frequency suitable for RF transmission. As part of a non-limiting group of hardware components, the communication interface 626 may include a reference frequency source, Digital-to-Analog Converters (DACs), Voltage Controlled Oscillators (VCO), Phase Locked Loops (PLLs) and frequency synchronizers, mixers, analog filters, Low Noise Amplifiers (LNAs), and other hardware components recognized as being used to up-convert a modulated carrier to a frequency suitable for RF transmission.

In operation, the arithmetic processor 624 retrieves executable instructions stored on the hard disk 616 and/or the removable media drive 618, stores the executable instructions to the main memory 612, and executes the executable instructions from the main memory. Alternatively, the arithmetic processor 624 may execute instructions directly from the hard disk 616 and/or the removable media drive 618 to implement the present embodiments. As an alternative to the hard disk 616 and/or the removable media drive 618, other computer readable storage mediums would be understood by those one having ordinary skill in the art, and are also included in the scope of the embodiments. Examples of the arithmetic processor 624 include a general purpose Central Processing Unit (CPU) and a Digital Signal Processor (DSP), for embodiments based at least in part on the execution of software, and a Field Programmable Gate Array (FPGA) and an Application Specific Integrated Circuit (ASIC), for embodiments based on hardware without software. Embodiments may also include both general purpose processors executing software instructions (i.e., CPUs and/or DSPs) as well as FPGAs and/or ASICs.

Numerous modifications and variations of the present advancements are possible in light of the above teachings. It is therefore to be understood that within the scope of the appended claims, the advancements may be practiced otherwise than as specifically described herein.

The invention claimed is:

1. A rain diversity switchover system comprising:
a diversity Satellite Access Station (SAS) including a transmitter modem and a receiver modem in communication with a satellite via a first satellite antenna;
a primary SAS including a transmitter modem and a receiver modem in communication with the satellite via a second satellite antenna, the transmitter and receiver modems of the primary SAS synchronized with the transmitter and receiver modems of the diversity SAS via a common time source;
a terrestrial digital network connecting the primary SAS to the diversity SAS;
a hub data processor that adjusts a timing of transmissions from the diversity SAS to the satellite relative to the common time source in accordance with a difference between a time of flight from the diversity SAS to the satellite and a time of flight from the primary SAS to the satellite; and
a switchover controller that controls, using the terrestrial digital network, a rain diversity switchover between the primary SAS and the diversity SAS,
wherein the switchover controller receives a signal from the diversity SAS indicating that the diversity SAS is ready to handle the rain diversity switchover.

2. The rain diversity switchover system according to claim 1, wherein acquisition of timing synchronization between a remote terminal and the diversity SAS is not required after the rain diversity switchover.

3. The rain diversity switchover system according to claim 1, wherein the rain diversity switchover is scheduled at predetermined time upon determination that at least a measured rain fade at the primary SAS is below a predetermined threshold.

4. The rain diversity switchover system according to claim 3, wherein
the switchover controller instructs, over the terrestrial digital network, the transmitter modem of the diversity SAS to start transmissions of a data carrier to the satellite at the scheduled predetermined time, and
the switchover controller instructs the transmitter modem of the primary SAS to cease transmissions of the data carrier to the satellite at the scheduled predetermined time.

5. The rain diversity switchover system according to claim 4, wherein after the rain diversity switchover is performed, outbound data packets are forwarded from the primary SAS over the terrestrial digital network to the transmitter modem of the diversity SAS and reaches a remote terminal in communication with the primary SAS prior to the rain diversity switchover within one second of the rain diversity switchover.

6. The rain diversity switchover system according to claim 1, wherein a timing of a burst detection window at the receiver modem of the diversity SAS is adjusted relative to the common time source in accordance with the difference between the time of flight from the diversity SAS to the satellite and the time of flight from the primary SAS to the satellite.

7. The rain diversity switchover system according to claim 1, wherein the difference in the time of flight from the diversity SAS to the satellite and the time of flight from the primary SAS to the satellite is determined by real-time monitoring of TDMA bursts from a remote terminal at both sites.

8. The rain diversity switchover system according to claim 1, wherein a difference between a rain fade at the diversity SAS and a rain fade at the primary SAS is determined by real-time monitoring of TDMA bursts received from a remote terminal at both the diversity SAS and the primary SAS.

9. The rain diversity switchover system according to claim 8, wherein the switchover controller executes rain diversity switchover from the primary SAS to the diversity SAS upon determination that the rain fade difference is above a predetermined threshold.

10. The rain diversity switchover system according to claim 1, further comprising:
a receiver for position corrected satellite timing signals that provides a pulse per second timing signal to the diversity SAS and primary SAS as the common time source.

11. A rain diversity switchover method comprising:
measuring a rain fade level at a primary SAS including a transmitter modem and a receiver modem in communication with a satellite;
synchronizing the transmitter and receiver modems of the primary SAS with a transmitter modem and a receiver modem of the diversity SAS via a common time source, the primary SAS connected to the diversity SAS over a terrestrial digital network;
determining a time of flight from the diversity SAS to the satellite and a time of flight from the primary SAS to the satellite;
adjusting a timing of transmissions from the diversity SAS to the satellite relative to the common time source in accordance with a difference between the time of flight from the diversity SAS to the satellite and the time of flight from the primary SAS to the satellite;
executing rain diversity switchover from the primary SAS to the diversity SAS upon determination that the measured rain fade level at the primary SAS is below a predetermined threshold; and
receiving a signal from the diversity SAS indicating that the diversity SAS is ready to handle the rain diversity switchover.

12. The rain diversity switchover method according to claim 11, wherein acquisition of timing synchronization between a remote terminal and the diversity SAS is not required after the rain diversity switchover.

13. The rain diversity switchover method according to claim 11,
scheduling execution of the rain diversity switchover at a predetermined time upon determination that the measured rain fade at the primary SAS is below the predetermined threshold.

14. The rain diversity switchover method according to claim 13, further comprising:
instructing, over the terrestrial digital network, the transmitter modem of the diversity SAS to start transmissions of a data carrier to the satellite at the scheduled predetermined time; and
instructing the transmitter modem of the primary SAS to cease transmissions of the data carrier to the satellite at the scheduled predetermined time.

15. The rain diversity switchover method according to claim 14, wherein after the rain diversity switchover is executed, outbound data packets are forwarded from the primary SAS over the terrestrial digital network to the transmitter modem of the diversity SAS and reaches a remote terminal in communication with the primary SAS prior to the rain diversity switchover within one second of the rain diversity switchover.

16. The rain diversity switchover method according to claim 11, further comprising:
adjusting a timing of a burst detection window at the receiver modem of the diversity SAS relative to the common time source in accordance with the difference between the time of flight from the diversity SAS to the satellite and the time of flight from the primary SAS to the satellite.

17. The rain diversity switchover method according to claim 11, wherein the time of flight from the diversity SAS to the satellite and the time of flight from the primary SAS to the satellite are determined by real-time monitoring of TDMA bursts from a remote terminal.

18. The rain diversity switchover method according to claim 11, further comprising:
determining a difference between a rain fade at the diversity SAS and a rain fade at the primary SAS by performing real-time monitoring of TDMA bursts received from a remote terminal at both the diversity SAS and the primary SAS.

19. The rain diversity switchover method according to claim 18, further comprising:
executing rain diversity switchover from the primary SAS to the diversity SAS upon determination that the determined rain fade difference is above a predetermined threshold.

20. The rain diversity switchover method according to claim 11, wherein the common time source is a receiver for position corrected satellite timing signals that provides a pulse per second timing signal to the diversity SAS and primary SAS.

21. A non-transitory computer readable storage medium having instructions stored therein, which when executed by a processor in digital rain diversity switchover system causes the processor to:
measure a rain fade level at a primary SAS including a transmitter modem and a receiver modem in communication with a satellite;
synchronize the transmitter and receiver modems of the primary SAS with a transmitter modem and a receiver modem of the diversity SAS via a common time source, the primary SAS connected to the diversity SAS over a terrestrial digital network;
determine a time of flight from the diversity SAS to the satellite and a time of flight from the primary SAS to the satellite;
adjust a timing of transmissions from the diversity SAS to the satellite relative to the common time source in accordance with a difference between the time of flight from the diversity SAS to the satellite and the time of flight from the primary SAS to the satellite;
execute rain diversity switchover from the primary SAS to the diversity SAS upon determination that the measured rain fade level at the primary SAS is below a predetermined threshold; and
receive a signal from the diversity SAS indicating that the diversity SAS is ready to handle the rain diversity switchover.

22. The non-transitory computer readable storage medium according to claim 21, wherein acquisition of timing synchronization between a remote terminal and the diversity SAS is not required after the rain diversity switchover.

23. The non-transitory computer readable storage medium according to claim 21, wherein the instructions further cause the processor to:
schedule execution of the rain diversity switchover at a predetermined time upon determination that the measured rain fade at the primary SAS is below the predetermined threshold.

24. The non-transitory computer readable storage medium according to claim 23, wherein the instructions further cause the processor to:
instruct, over the terrestrial digital network, the transmitter modem of the diversity SAS to start transmissions of a data carrier to the satellite at the scheduled predetermined time, and
instruct the transmitter modem of the primary SAS to cease transmissions of a data carrier to the satellite at the scheduled predetermined time.

25. The non-transitory computer readable storage medium according to claim 24, wherein after the rain diversity switchover is executed, outbound data packets are forwarded from the primary SAS over the terrestrial digital network to the transmitter modem of the diversity SAS and reaches a remote terminal in communication with the primary SAS prior to the rain diversity switchover within one second of the rain diversity switchover.

26. The non-transitory computer readable storage medium according to claim 25, wherein the instructions further cause the processor to:

adjust a timing of a burst detection window at the receiver modem of the diversity SAS relative to the common time source in accordance with the difference between the time of flight from the diversity SAS to the satellite and the time of flight from the primary SAS to the satellite.

27. The non-transitory computer readable storage medium according to claim 21, wherein the instructions further cause the processor to:

determine a difference between a rain fade at the diversity SAS and a rain fade at the primary SAS by performing real-time monitoring of TDMA bursts received from a remote terminal at both the diversity SAS and the primary SAS.

28. The non-transitory computer readable storage medium according to claim 27, wherein the instructions further cause the processor to:

execute rain diversity switchover from the primary SAS to the diversity SAS upon determination that the determined rain fade difference is above a predetermined threshold.

29. The non-transitory computer readable storage medium according to claim 21, wherein the time of flight from the diversity SAS to the satellite and the time of flight from the primary SAS to the satellite are determined by real-time monitoring of TDMA bursts from a remote terminal.

30. The non-transitory computer readable storage medium according to claim 21, wherein the common time source is a receiver for position corrected satellite timing signals that provides a pulse per second timing signal to the diversity SAS and primary SAS.

* * * * *